March 17, 1964   R. J. RAUPP ETAL   3,125,062
DIFFERENTIAL PRESSURE RESPONSIVE DEVICE
Filed June 12, 1961
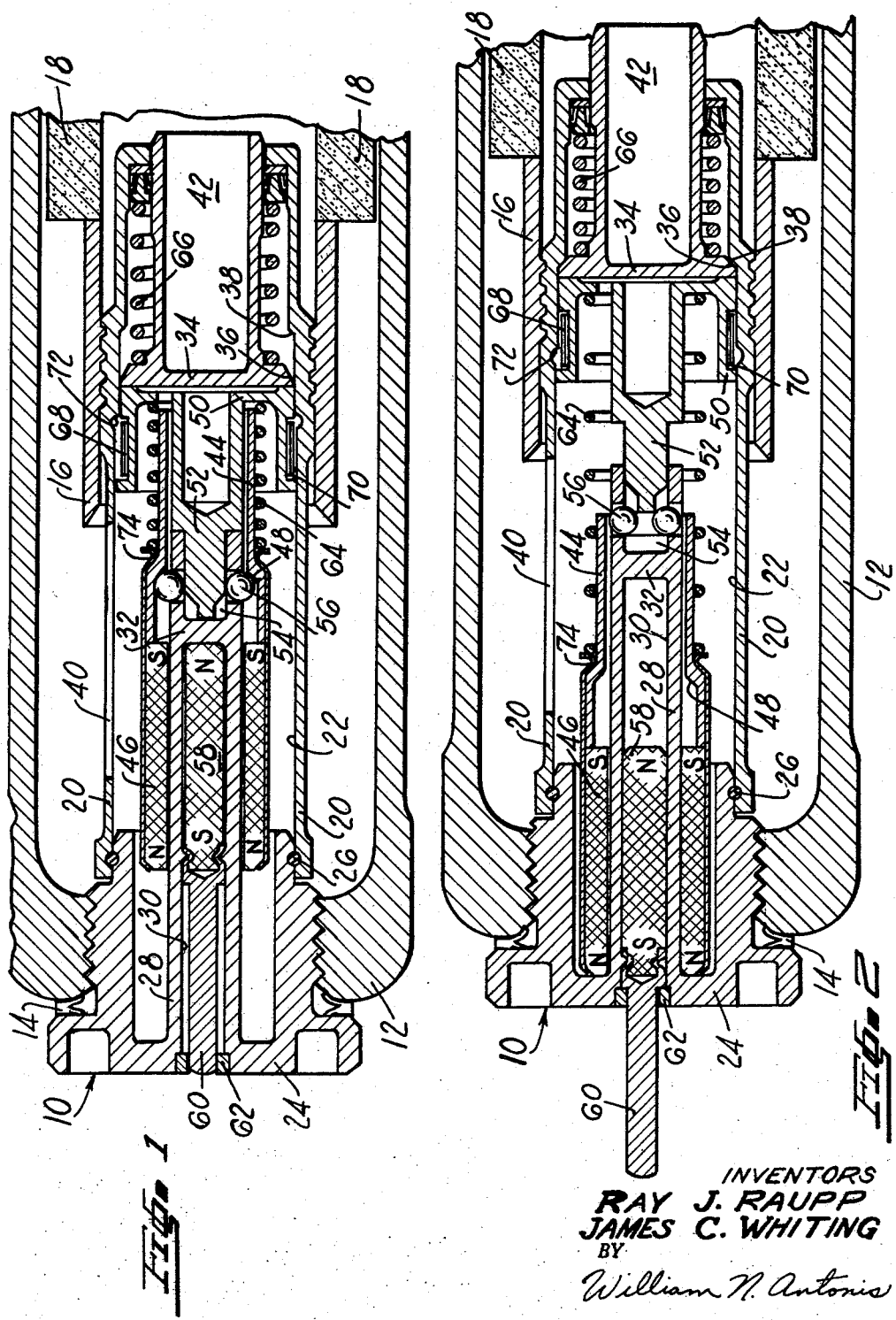
INVENTORS
*RAY J. RAUPP*
*JAMES C. WHITING*
BY
ATTORNEY United States Patent Office 3,125,062
Patented Mar. 17, 1964

3,125,062
DIFFERENTIAL PRESSURE RESPONSIVE DEVICE
Ray J. Raupp and James C. Whiting, Madison Heights, Mich., assignors to The Bendix Corporation, Madison Heights, Mich., a corporation of Delaware
Filed June 12, 1961, Ser. No. 116,537
6 Claims. (Cl. 116—70)

This invention relates to differential pressure responsive devices and more particularly to improvements in a temperature sensitive magnetically operated differential pressure indicating device.

Differential pressure sensing devices are widely used in industry and in the filter industry in particular. Such devices normally sense changes in pressure drop across a filter element when the element becomes clogged and indicate in some manner or another that the filter element should be replaced. Since the viscosity of fluids normally increases as temperatures drop, and abnormally high pressure drops will occur across a filter element under such circumstances, even though the element is clean, many devices have utilized various types of temperature controlled mechanisms for preventing false indications at lower temperatures.

Accordingly, it is an object of this invention to provide a novel, simple differential pressure indicating device which will indicate a given differential pressure only at temperatures above a predetermined value.

Another object of this invention is to provide a differential pressure indicating device which incorporates a temperature lockout mechanism which is immersed in the fluid being filtered so that it can sense fluid temperature changes directly.

A further object of this invention is to provide a differential pressure indicator which is tamper-proof in that it cannot be reset after the indicator has moved to a signalling position until after the indicator assembly has been removed from the filter.

A still further object of this invention is to provide a differential pressure indicator which utilizes a novel arrangement of magnets, which are separated by a cylindrical wall, to cause an indicator pin to be magnetically moved from a non-signalling to a signalling position at differential pressures above a predetermined value. Such an arrangement, which permits an indicator pin to be extended remotely, prevents external leakage along the peripheral surface of said pin.

More particularly, it is an object of this invention to provide an indicating device comprising a first magnetic means, whose movements from a first to a second position are permitted by movement of a control member from an operative to an inoperative position, and a second magnetic means which is movable from a non-signalling to a signalling position as a result of magnetic attraction for said first magnetic means during movement thereof from said first to said second position. Movement of the control member from an operative to an inoperative position is prevented at differential pressures below a predetermined value and/or at temperatures below a predetermined value.

Another object of this invention is to provide a unique compact indicator which is arranged so that the same resilient means will initially cause the control member to move to an inoperative position at differential pressures and temperatures above a predetermined value and will subsequently cause said first magnetic means to move to its second position after the control member has reached its inoperative position.

The above and other objects and features of the invention will become apparent from the following description of the mechanism taken in connection with the accompanying drawing which forms a part of this specification and in which:

FIGURE 1 is a sectional view of the device, at differential pressures below a predetermined value, which shows the indicator pin in a non-signalling position; and FIGURE 2 is a sectional view, similar to FIGURE 1, but at differential pressures and temperatures above a predetermined value, which shows the indicator pin in an extended signalling position.

Numeral 10 in FIGURES 1 and 2 indicates a temperature sensitive differential pressure indicator assembly which is threaded at one end into the end of a filter bowl 12. A metallic seal 14 is utilized to prevent external fluid leakage. The other end of the assembly enters a close fitting sleeve 16, which is attached to a filter element 18, so that leakage through the annular gap is held to a minimum.

The indicator assembly 10, which is intended for use in a hydraulic filter operating between −65° F. and 630° F., includes a housing 20 having a bore 22 therein, and a fitting 24 which is suitably connected to housing 20 through means such as wire locking means 26. Extendtending from the fitting 24 is a hollow tubular member 28 having a bore 30 therein which is prevented from communicating with bore 22 by a partition 32. Located within bore 22 is a piston member 34 which is slidable from a first or normally neutral position, as shown in FIGURE 1, to a second position away from said neutral first position, as shown in FIGURE 2. Piston travel is limited by the chamfered flange 36 bottoming on the chamfered step 38 in the housing bore 22. Passage 40 in housing 20 communicates one side of piston member 34 with filter inlet pressure while passage 42 communicates the other side of the piston member with filter outlet pressure. Located within bore 22 is a sleeve-like retainer member 44, which carries a magnetic sleeve-like element 46 and has a shoulder 48 formed on the inner surface thereof. The retainer is movable from a first position, as shown in FIGURE 1, to a second position, as shown in FIGURE 2. Also located within bore 22 is a control member 50 having a trigger pin 52 which extends into a cavity 54 formed at the end of tubular member 28. This trigger pin maintains a pair of balls 56 in a protruding position for abutment with shoulder 48, as shown in FIGURE 1, and thereby prevents retainer member 44 from moving to the position shown in FIGURE 2.

A magnetic element 58 and an indicator pin 60, which is suitably connected thereto, are located within bore 30 and are movable from a non-signalling position, as shown in FIGURE 1, to a signalling position, as shown in FIGURE 2. Outward movement of the indicator pin is limited by a stop 62.

The control member 50 is movable from an operative position, as shown in FIGURE 1, wherein the retainer 44 is restrained from moving, to an inoperative position, as shown in FIGURE 2, wherein the retainer is unrestrained and is free to move to the left under the urging of a spring 64. It should be noted that this spring 64 serves a dual purpose in that it initially urges the control member 50 towards its inoperative position, so long as the retainer 44 is prevented from moving by abutment of shoulder 48 with protruding balls 56, and subsequently urges the retainer member to the left after the control member has moved to its inoperative position, as shown in FIGURE 2. A spring 66 is located in bore 22 for urging the piston member 34 towards its normally neutral position and for urging said control member 50 towards its operative position.

Suitably attached to the control member is a coiled bimetallic strip 68 which at temperatures above a predetermined value is retracted within a groove 70 formed in the control member so as not to hinder movement of the control member from the operative to the inoperative position. However, if temperatures below a predetermined value occur, the bimetallic strip will expand and engage the ridge 72, thereby preventing movement of the control member, even if differential pressures above the predetermined value have caused the piston member 34 to bottom on the chamfered step 38.

Operation of the indicator will be as follows: As long as the filter element 18 is clean, all of the components of the indicator assembly 10 will remain in the positions shown in FIGURE 1. The indicator pin 60 will not move to a signalling position, even if spurious forces act thereon, because of the magnetic attraction which is provided by the arrangement of outer and inner magnetic elements 46 and 58.

As the filter element 18 starts to get clogged, the pressure drop thereacross, which is also acting across piston member 34, will eventually result in a force of sufficient magnitude to overcome the preload of spring 66 and cause the piston member to bottom on the chamfered step 38. If the fluid temperature is above a predetermined value and the bimetallic strip 68 is retracted in groove 70, the control member 50 and trigger pin 52 will follow the piston member to the right under the urging of spring 64. Such movement will allow the balls 56 to move radially inward and will permit the retainer 44 and magnetic element 46 to move to the left. The outer cylindrical magnet 46, which previously retained the magnet 58 in a non-signalling position through magnetic attraction, now, upon movement to the left, utilizes this magnetic attraction to also cause the inner magnet 58 and indicator pin 60 to move to a visible signalling position to indicate that the pressure differential across the filter element has exceeded the allowable limit.

If the temperature of the fluid being filtered is below the predetermined value, the bimetallic strip 68 will expand and engage the ridge 72, thus preventing movement of the control member 50, even if differential pressures above a predetermined value have caused the piston member 34 to move to the right. If such movement of the piston was not due simply to the increased viscosity of the fluid being filtered, after the temperature of the fluid rises above the predetermined value, the bimetallic strip will contract into the groove 70 and will permit the spring 64 to move the control member 50 to the right until it contacts the piston. When this occurs, the indicator pin 60 will move to the signalling position in the manner previously described.

Resetting of the indicator can be accomplished only by removing the indicator from the bowl and moving the retainer assembly to the "set" position by means of a pointed tool inserted into slot 74. This feature makes the unit tamper-proof in that the unit cannot be reset without removing it from the filter.

Although this invention has been described in connection with a specific embodiment it will be obvious to those skilled in the art that various changes may be made in the form, structure, and arrangement of parts without departing from the spirit of the invention. Accordingly, we do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. A differential pressure indicating device comprising a housing having a first bore formed therein, a fitting for closing one end of said first bore, said fitting having a hollow tubular member extending into said first bore, said tubular member having a second bore formed therein, partition means located in said tubular member for preventing communication between said first and second bores and for forming a cavity within and at one end of said tubular member, a piston member slidable in said first bore from a first position to a second position, stop means formed on said housing for preventing movement of said piston member past said second position, first passage means located in said housing for communicating one side of said piston member with a first pressure source, second passage means located in said housing for communicating the other side of said piston member with a second pressure source, first spring means located in said first bore and confined between said housing and said piston member for opposing movement of said piston member from said first to said second position, a sleeve-like retainer member surrounding said tubular member and movable from a first site to a second site, said retainer member having inner and outer surfaces and a shoulder formed on the inner surface thereof, passage means for communicating said cavity with said first bore, a plurality of balls located in said passage means, said balls being partially located within said cavity and partially protruding from said tubular member for abutting said shoulder and preventing movement of said retainer member to said second site, a control member located in said first bore, a trigger pin operatively connected to said control member and extending into said cavity for contacting and maintaining said balls in a protruding position for abutment with said shoulder, first magnetic means operatively connected to said retainer member and movable therewith from said first to said second site, second magnetic means located in said second bore and movable from a non-signalling to a signalling position, said second magnetic means being magnetically retained in said non-signalling position by magnetic attraction to said first magnetic means while said retainer member remains at said first site and being magnetically moved to said signalling position by magnetic attraction to said first magnetic means when said retainer member is moved to said second site, second spring means located in said housing between said retainer member and said control member for urging said retainer member towards said second site and for urging said control member towards said piston member, said second spring means upon movement of said piston member towards said second position being arranged to initially cause movement of said control member and the trigger pin connected thereto towards the second position of said piston member until said balls are free to move into said cavity and to subsequently cause movement of said retainer member to said second site after said balls have moved into said cavity, and an indicator pin operatively connected to said second magnetic means and movable therewith from said non-signalling to said signalling position.

2. A differential pressure indicating device as defined in claim 1 wherein said control member includes a bimetallic element operatively connected thereto which engages said housing and prevents movement of said control member at temperatures below a predetermined value.

3. A differential pressure indicating device comprising a housing having a first bore formed therein, a hollow tubular member extending into said first bore, said tubular member having a second bore formed therein, means for preventing communication between said first and second bores, piston means movable in said first bore toward and away from a normally neutral position, stop means formed on said housing for limiting movement of said piston means away from said neutral position, first passage means located in said housing for communicating one side of said piston means with a first pressure source, second passage means located in said housing for communicating the other side of said piston means with a second pressure source, retainer means located in said first bore and movable from a first position to a second position, first magnetic means operatively connected to said retainer means and movable therewith from said first to said second position, second magnetic means located in said second bore and movable from a non-signalling to a signalling position, said second magnetic means being magnetically retained in said non-signalling position by said first magnetic means through magnetic attraction when said retaining means is in said first position and being magnetically moved to said signalling position by said first magnetic means through magnetic attraction when said retaining means and first magnetic means move to said second position, control means located in said first bore and operatively connected to said retainer means, said control means having an operative position for preventing movement of said retainer means from said first to said second position and an inoperative position for permitting movement of said retainer means from said first to said second position, first resilient means located in said first bore and confined between said housing and said piston means for urging said piston means towards said neutral position and said control means towards said operative position, and second resilient means located in said housing between said retainer means and said control means for urging said retainer means towards said second position and for urging said control means towards said piston means and said inoperative position, said second resilient means being arranged to initially cause movement of said control means towards said piston means and said inoperative position when said piston means moves away from said neutral position and to subsequently cause movement of said retainer means to said second position after said control means has reached said inoperative position.

4. A differential pressure indicating device as defined in claim 3 wherein said control means includes temperature sensitive means for preventing movement thereof from said operative to said inoperative position at temperatures below a predetermined value.

5. A differential pressure indicating device comprising a housing, differential pressure sensing means located in said housing and movable away from a normally neutral position at differential pressures above a predetermined value, first magnetic means located in said housing and movable from a first position to a second position, second magnetic means located in said housing and movable from a non-signalling to a signalling position, said second magnetic means being magnetically retained in said non-signalling position by said first magnetic means through magnetic attraction when said first magnetic means is in said first position and being magnetically moved to said signalling position by said first magnetic means through magnetic attraction when said first magnetic means moves to said second position, control means located in said housing and operatively connected to said first magnetic means, said control means having an operative position for preventing movement of said first magnetic means from said first to said second position and an inoperative position for permitting movement of said first magnetic means from said first to said second position, first resilient means located in said housing for urging said pressure sensing means towards said neutral position and said control means towards said operative position, and second resilient means located in said housing for urging said first magnetic means towards said second position and for urging said control means towards said pressure sensing means and said inoperative position, said second resilient means initially causing movement of said control means towards said pressure sensing means and said inoperative position when said pressure sensing means moves away from said neutral position and subsequently causing movement of said first magnetic means to said second position after said control means has reached said inoperative position.

6. A differential pressure indicating device comprising a housing, first magnetic means located in said housing and movable from a first position to a second position, second magnetic means located in said housing and movable from a non-signalling to a signalling position, said second magnetic means being magnetically retained in said non-signalling position by said first magnetic means through magnetic attraction when said first magnetic means is in said first position and being magnetically moved to said signalling position by said first magnetic means through magnetic attraction when said first magnetic means moves to said second position, differential pressure sensing means located in said housing and operatively connected to said first magnetic means, said pressure sensing means having a normally neutral operative position for preventing movement of said first magnetic means from said first to said second position and an inoperative position away from said neutral position at differential pressures above a predetermined value for permitting movement of said first magnetic means from said first to said second position, first resilient means located in said housing for urging said pressure sensing means towards said neutral operative position, and second resilient means located in said housing for urging said first magnetic means towards said second position and for urging said pressure sensing means towards said inoperative position away from said neutral position, said second resilient means causing movement of said first magnetic means to said second position after said pressure sensing means has moved to said inoperative position away from said neutral position at differential pressures above said predetermined value.

References Cited in the file of this patent
UNITED STATES PATENTS

| | | |
|---|---|---|
| 2,942,572 | Pall | June 28, 1960 |
| 2,954,751 | Barnes | Oct. 4, 1960 |